United States Patent
Kozyuk et al.

(10) Patent No.: US 9,453,180 B2
(45) Date of Patent: Sep. 27, 2016

(54) PROCESS FOR DEGUMMING OILS

(71) Applicant: Arisdyne Systems, Inc., Cleveland, OH (US)

(72) Inventors: Oleg Kozyuk, North Ridgeville, OH (US); Peter Reimers, Shaker Heights, OH (US); Paul A. Reinking, North Olmsted, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 57 days.

(21) Appl. No.: 14/514,813

(22) Filed: Oct. 15, 2014

(65) Prior Publication Data
US 2016/0108338 A1   Apr. 21, 2016

(51) Int. Cl.
*C11B 3/00* (2006.01)
*C11B 3/04* (2006.01)
*G11B 3/06* (2006.01)
*C11B 3/16* (2006.01)

(52) U.S. Cl.
CPC .................. *C11B 3/04* (2013.01); *C11B 3/001* (2013.01); *C11B 3/16* (2013.01); *G11B 3/06* (2013.01)

(58) Field of Classification Search
CPC ........... C11B 3/04; C11B 3/001; C11B 3/01; C11B 3/16
USPC ........................................................ 554/212
See application file for complete search history.

(56) References Cited

U.S. PATENT DOCUMENTS

| | | | |
|---|---|---|---|
| 4,698,185 A | 10/1987 | Dijkstra et al. | |
| 5,717,181 A | 2/1998 | Colgate | |
| 5,810,052 A | 9/1998 | Kozyuk | |
| 5,931,771 A | 8/1999 | Kozyuk | |
| 5,937,906 A | 8/1999 | Kozyuk | |
| 5,969,207 A | 10/1999 | Kozyuk | |
| 6,001,640 A | 12/1999 | Loeffler et al. | |
| 6,012,492 A | 1/2000 | Kozyuk | |
| 6,035,897 A | 3/2000 | Kozyuk | |
| 6,190,538 B1 | 2/2001 | Gosselink et al. | |
| 7,135,155 B1 | 11/2006 | Long, Jr. et al. | |
| 7,762,715 B2 | 7/2010 | Gordon et al. | |
| 7,935,157 B2 | 5/2011 | Kozyuk et al. | |

(Continued)

FOREIGN PATENT DOCUMENTS

| | | |
|---|---|---|
| CA | 2644085 A1 | 9/2007 |
| RU | 2288948 C1 | 12/2006 |

(Continued)

OTHER PUBLICATIONS

Gogate et al., A review and assessment of hydrodynamic cavitation as a technology for the future; Ultrasonics Sonochemistry, 2005, vol. 12, pp. 21-27, Elsevier.

(Continued)

*Primary Examiner* — Deborah D Carr
(74) *Attorney, Agent, or Firm* — Pearne & Gordon LLP

(57) ABSTRACT

A multi-stage agitation system is used for degumming vegetable oil to increase yield and reduce phosphatides. A high-shear mixing phase, that can include multiple stages, subjects an oil mixed with acid and base to a shear rate of greater than 15,000 s$^{-1}$ to form a neutralized oil mixture. A low-shear mixing phase is further used to disperse water into the neutralized oil mixture. A separation step can be used to remove the phosphatides from the treated oil to form a degummed oil product.

20 Claims, 1 Drawing Sheet

(56) References Cited

U.S. PATENT DOCUMENTS

| | | |
|---|---|---|
| 8,042,989 B2 | 10/2011 | Gordon et al. |
| 8,911,808 B2 | 12/2014 | Gordon et al. |
| 8,945,644 B2 | 2/2015 | Gordon et al. |
| 2012/0181216 A1 | 7/2012 | Kozyuk et al. |
| 2013/0062249 A1 | 3/2013 | Kozyuk et al. |
| 2014/0087042 A1 | 3/2014 | Gordon et al. |
| 2014/0099687 A1 | 4/2014 | Gordon et al. |
| 2014/0363855 A1 | 12/2014 | Gordon et al. |

FOREIGN PATENT DOCUMENTS

| | | | |
|---|---|---|---|
| RU | 2333942 C1 | 9/2008 | |
| WO | WO 2007103005 A1 * | 9/2007 | ............. C11B 3/001 |

OTHER PUBLICATIONS

Gogate, et al., Cavitation: A technology on the horizon; Current Science, 2006, vol. 91, No. 1, pp. 35-46, Research Account.

Gogate, et al., Engineering Design Methods for Cavitation Reactors II: Hydrodynamic Cavitation; AICHE Journal, 2000, vol. 46, No. 8, pp. 1641-1649.

Kumar, et al., Experimental quantification of chemical effects of hydrodynamic cavitation; Chemical Engineering Science, 2000, vol. 55, pp. 1633-1639, Pergamon.

Pandit, et al., Improve Reactions with Hydrodynamic Cavitation; Chemical Engineering Progress, May 1999, pp. 43-50, www.aiche.org.

Moulton, et al., Continuous Ultrasonic Degumming of Crude Soybean Oil; Journal of American Oil Chemists Society, Jan. 1990, vol. 67, No. 1, pp. 33-38, Springer.

Nano cavitation: a proven new concept; Processing & Technology, Aug./Sep. 2012, www.oilsandfatsinternational.com.

Greyt, et al., Use of Nano Reactors in Edible Oil Processing; 102end AOCS Annual Meeting, May 1-4, 2011, Cincinnati, Ohio Presentation, www.desmetballestra.com.

* cited by examiner

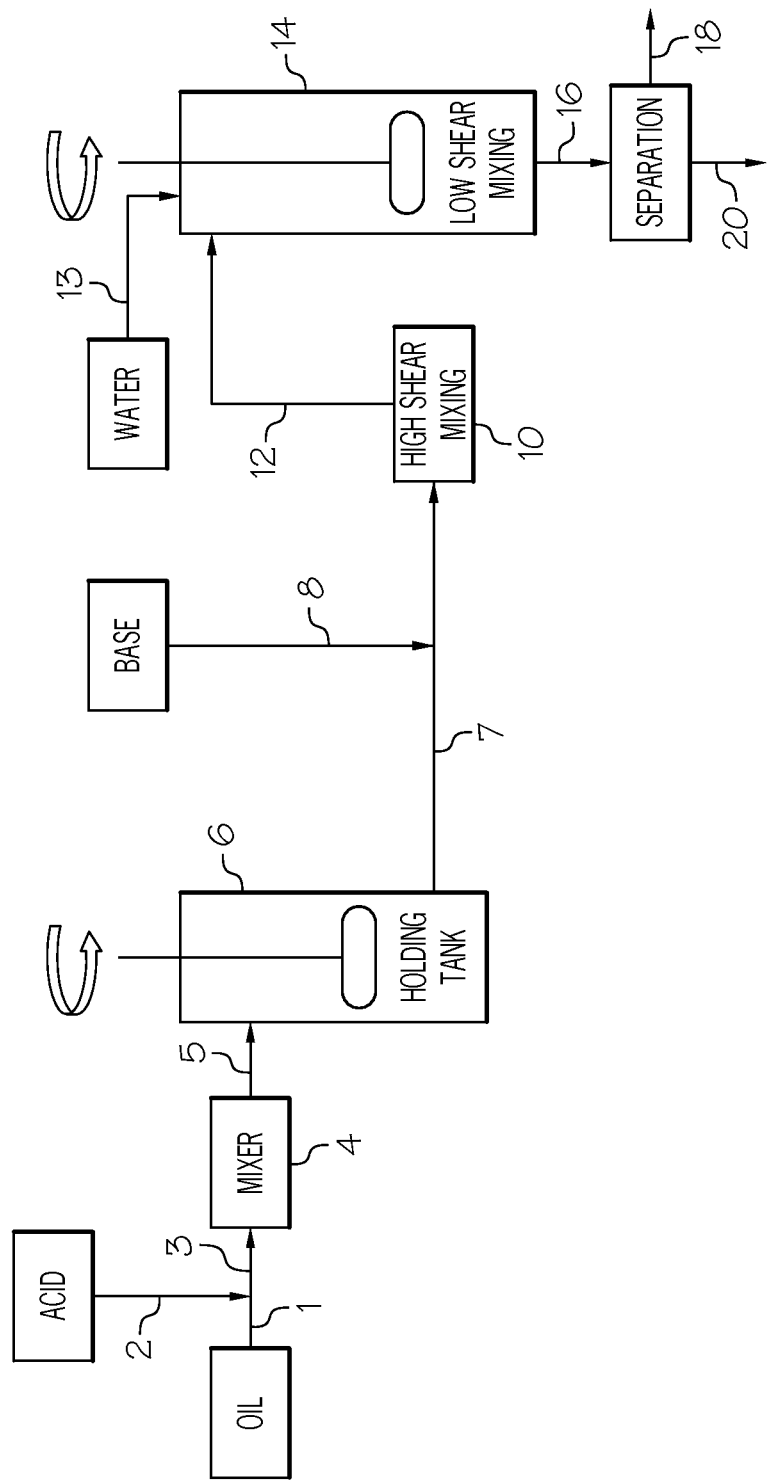

PROCESS FOR DEGUMMING OILS

FIELD

The invention relates to improved processes for refining oils, and more particularly, processes for improved processes for degumming vegetable oils having free fatty acids and phosphatides.

BACKGROUND

Vegetable oils are typically oil that has been pressed or extracted, such as from a vegetable source. Many vegetable oils contain some form of phosphatides (e.g., hydratable or non-hydratable), commonly known as gums. For instance, soybean oil contains about 1-3%, corn oil 0.6-0.9%, sunflower oil 0.5-0.9%, and canola oil (crude) 1-3% of gums.

Gums can be partially or totally removed from vegetable oils through several different known degumming processes. The most commonly used processes in the industry are water degumming, acid degumming, caustic refining and enzymatic degumming, for example, as disclosed in U.S. Pat. Nos. 4,049,686; 5,239,096; 5,264,367; 5,286,886; 6,001,640; 6,033,706; 7,494,676 and 7,544,820, and U.S. Pat. Pub. Nos. 2007/0134777; 2008/0182322 and 2012/0258017.

A method disclosed in U.S. Pat. No. 4,240,972 discloses adding an acid to a heated stream of crude vegetable oil and then immediately passing the mixture through a static mixer to produce an acid-in-oil dispersion, and then separating the dispersion into an oil phase and an aqueous phase containing the phosphatides. This method claims that producing ultrafine acid droplets eliminates the need for lengthy acid-oil contact times. In another example, U.S. Pat. No. 4,698,185 describes a vegetable oil refining method with the steps of dispersing an aqueous organic acid in a water-degummed oil to form an acid-in-oil dispersion, allowing the phases to remain in contact for a time sufficient to decompose metal salts of phosphatidic acid, adding a base to the acid-in-oil dispersion to increase pH to above 2.5 without substantial formation of soap, and finally separating the dispersion into an oil phase and an aqueous phase containing the phosphatides.

Yet another method, as disclosed in U.S. Pat. No. 6,844,458, vegetable oil is combined with organic acid and subjecting to shearing to disperse the acid solution in the oil. The resulting acid-and-oil mixture is further mixed for a time sufficient to sequester contaminants into a hydrated impurities phase, producing a purified vegetable oil phase.

U.S. Pat. Pub. No. 2013/0011887 describes a method for hydration of non-hydratable phospholipids in an oil by mixing an aqueous acid with the oil to obtain an acidic mixture having pH of less than about 4, and mixing a base with the acidic mixture to obtain a reacted mixture having pH of about 6-9, wherein the mixing in steps creates an emulsion that has about 60% of an aqueous phase by volume in a droplet size between 15 μm to 45 μm in size.

The above-noted processes have the disadvantage that they have high oil yield losses, for example 3%, which also have impact the economics of the process. Accordingly, there is a continuing need for alternative refining methods, which can provide cost-effective removal of phosphorous, with improved oil yield.

SUMMARY

A process for degumming oil can include the steps of adding acid to an oil to be degummed to form an acid-oil mixture. A base, for example in the form an aqueous base, is further added and mixed with the acid-oil mixture, wherein the mixing is at high shear and includes passing the mixture through an agitation mixer at a shear rate of greater than 15,000 $s^{-1}$ to form a neutralized oil mixture. Water in the amount of 0.2 to 4 weight percent is added to the neutralized oil mixture. The amount of water is measured as the total weight of the oil in the neutralized oil mixture. The water-added neutralized oil mixture is mixed with an agitation mixer at a transitional state flow measuring Reynolds number ($N_{Re}$) in the range of from 10 to 1000 to disperse the water in neutralized oil mixture. A portion of the water added to the neutralized oil mixture is separated to obtain a degummed oil product having a reduced amount of phosphatides.

The agitation mixer used to provide high shear mixing in the degumming process can include high-speed pumps, colloid mills, high-pressure jet nozzles, static mixers, high-pressure valve type homogenizers, turbine type rotor-rotor and rotor-stator homogenizers, hydrodynamic cavitation reactors or ultrasonic cavitation devices.

The oil being degummed by the above process can include a vegetable oil, for example, the vegetable oil can be a crude oil or water-degummed oil.

The acid being added to the oil to be degummed can include phosphoric acid, hydrochloric acid, sulfuric acid, ascorbic acid, acetic acid, citric acid, fumaric acid, maleic acid, tartaric acid, succinic acid, glycolic acid, or a combination thereof.

The base being added to the acid-oil mixture can include sodium hydroxide, potassium hydroxide, sodium silicate, sodium carbonate, calcium carbonate, or a combination thereof.

The agitation mixer being used to generate a transitional state flow can measure a Reynolds number ($N_{Re}$) in the range of from 100 to 600 or less than 600 for dispersing the water in the neutralized oil mixture.

The degummed oil can have a reduced phosphatide content of at least 90 weight percent as compared to the phosphatide content of the oil used to form the acid-oil mixture. In another embodiment, the phosphatide content of the degummed oil can be at least 95 weight percent less than the phosphatide content of the oil used to form the acid-oil mixture.

The degummed oil can have a reduced phosphatide content, for example, the oil used to form the acid-oil mixture can have a phosphatide content greater than 200 ppm and the degummed oil can have a phosphatide content of less than 50 ppm. In another embodiment, the oil used to form the acid-oil mixture can have a phosphatide content greater than 500 ppm and the degummed oil can have a phosphatide content of less than 50 ppm.

In another embodiment, a process for degumming oil can include the steps of adding acid to an oil to be degummed to form an acid-oil mixture. A base, for example in the form an aqueous base, is further added and mixed with the acid-oil mixture, wherein the mixing is at high shear and includes a multi-stage agitation, wherein each stage of the multi-stage agitation mixes the base and acid-oil mixture at a shear rate of greater than 15,000 $s^{-1}$ to form a neutralized oil mixture. Water in the amount of 0.2 to 4 weight percent is added to the neutralized oil mixture. The amount of water is measured as total weight of the oil in the neutralized oil mixture. The water-added neutralized oil mixture is mixed with an agitation mixer at a transitional state flow measuring a Reynolds number ($N_{Re}$) in the range of from 10 to 1000 to disperse the water in neutralized oil mixture. A portion of the water added to the neutralized oil mixture is separated to obtain a degummed oil product having a reduced amount of phosphatides.

Each stage of the multi-stage agitation can mix the acid-oil mixture and base at a shear rate of greater than 20,000 s$^{-1}$, wherein the multi-stage agitation can include at least two, three or four stages. In another embodiment, the multi-stage agitation can include at least one stage that mixes the acid treated oil at a shear rate of greater than 50,000 s$^{-1}$. In yet another embodiment, the multi-stage agitation can include at least one stage that mixes the acid treated oil at a shear rate of greater than 100,000 s$^{-1}$.

The multi-stage oil degumming process can reduced the phosphatide content of the oil. For instance, the degummed oil can have a reduced phosphatide content of at least 90 weight percent as compared to the phosphatide content of the oil used to form the acid-oil mixture. In another embodiment, the phosphatide content of the degummed oil can be at least 95 weight percent less than the phosphatide content of the oil used to form the acid-oil mixture. In another embodiment, the multi-stage degumming process can reduce phosphatides in such a way that the oil used to form the acid-oil mixture can have a phosphatide content greater than 200 ppm and the degummed oil can have a phosphatide content of less than 50 ppm. In another embodiment, the oil used to form the acid-oil mixture can have a phosphatide content greater than 500 ppm and the degummed oil can have a phosphatide content of less than 50 ppm.

The oil used in the multi-stage oil degumming process can include a vegetable oil, for example, the vegetable oil can be a crude oil or water-degummed oil.

In another embodiment, the process using the multi-stage agitation can include a series of at least three or four orifices, wherein the first orifice in the series mixes the acid treated oil at a shear rate of greater than 100,000 s$^{-1}$ and the second orifice and the third orifice in the series mixes the acid treated oil at a shear rate of greater than 50,000 s$^{-1}$. A fourth orifice can be added to the series to mix the acid treated oil at a shear rate of greater than 20,000 s$^{-1}$.

BRIEF DESCRIPTION OF THE DRAWINGS

FIG. 1 shows a block flow diagram of an oil degumming process using high shear and low shear agitation mixing to reduce phosphatide levels in the oil being treated.

DETAILED DESCRIPTION

Herein, when a range such as 5-25 (or 5 to 25) is given, this means preferably at least 5 and, separately and independently, preferably not more than 25. In an example, such a range defines independently not less than 5, and separately and independently, not less than 25.

A process has been discovered for an efficient, cost-effective oil degumming process by use of a high shear and low shear combination of mixing with an acid, base and water. It has been found that a multi-stage agitation that combines one or more high shear mixing stages and at least one low shear mixing stage can improve reduction in phosphatide content with a higher oil yield.

As illustrated in the diagram of FIG. 1, one embodiment of a process for degumming oils can include multiple stages. As shown in the drawings, pipes, hoses, or other conventional, industrial equipment can be used to facilitate the fluid communication of the elements and streams discussed below.

Oil is shown as stream 1 in the FIGURE. The oils that can be degummed include vegetable oils, such as crude vegetable oil or water-degummed oil. Examples of vegetable oils can include, for example, acai oil, almond oil, babassu oil, blackcurrent seed oil, borage seed oil, canola oil, cashew oil, castor oil, coconut oil, coriander oil, corn oil, cottonseed oil, crambe oil, flax seed oil, grape seed oil, hazelnut oil, hempseed oil, jatropha oil, jojoba oil, linseed oil, macadamia nut oil, mango kernel oil, meadowfoam oil, mustard oil, neat's foot oil, olive oil, palm oil, palm kernel oil, palm olein, peanut oil, pecan oil, pine nut oil, pistachio oil, poppy seed oil, rapeseed oil, rice bran oil, safflower oil, sasanqua oil, sesame oil, shea butter, soybean oil, sunflower seed oil, tall oil, tsubaki oil, walnut oil or combinations thereof.

The phosphatide content of the oil 1 can be in the range of 30 to 1200 ppm. The phosphatide content (or also referred to as phospholipid content), as used herein, is expressed as ppm phosphorus in oil. In an example, the phosphatide content of crude oil, such as vegetable crude oil, can be in the range of 200 to 1200 ppm. In another example, the phosphatide content of previously water-degummed oil, such as water-degummed vegetable oil, can be in the range of 30 to 200 ppm.

The oil 1 can be heated prior to the degumming process (not shown), such as prior to acid being added. For example, the oil can be passed through a heat exchanger, such as a plate and frame heat exchanger, to increase the temperature of the oil. The oil can be heated to a temperature in the range of 20 to 100° C., or at least to 30, 40, 50, 60, 70, 80, 90 or 100° C. Preferably, the oil is maintained at a temperature in the range of 40 to 95° C. during the degumming process as deemed suitable to one skilled in the art.

An acid, such as an aqueous acid solution, can be added to the oil to be degummed to form an acid-oil mixture 3. Acids can promote hydration of the non-hydrated phosphatides contained in the oil. The acid is shown as stream 2. The acid can include an inorganic or organic acid, for example, phosphoric acid, hydrochloric acid, sulfuric acid, ascorbic acid, acetic acid, citric acid, fumaric acid, maleic acid, tartaric acid, succinic acid, glycolic acid or a combination or mixture thereof. The acid is used in range from about 50 to 500 ppm as measured by weight of the oil. For example, a high concentration acid in water solution can be used, such as a 75 weight percent phosphoric acid water solution. The aqueous acid solution can be stored in a working or holding tank prior to being added to the oil 1.

The acid-oil mixture 3 can be passed through a mixer 4 to disperse 5 the acid 2 in the oil 1. Any suitable mixer 4 can be used, for example, the use of a dynamic mixer is preferred to disperse the acid in the oil. Using a dynamic mixer can provide more effective mixing and promote the use of concentrated acid solutions, which can reduce the volume of acid solution being added to the oil. Examples of mixers 4 that can be used include centrifugal pumps or in-line mixers.

The acid-oil mixture 5 can be optionally transferred to a holding tank 6. The holding tank 6 can store the acid-oil mixture for a suitable predetermined amount of time. For example, the acid-oil mixture can be held for a period of 1 minute to 24 hours. The holding tank 6 can be equipped with a mixer or stirrer for maintaining a homogenous mixture. The holding tank 6 can be jacketed or equipped with another heating apparatus, such as coils, for maintaining a desired holding temperature.

A base, such as in an aqueous base solution, can be added to the acid-oil mixture 5, for example before the optional holding tank 6 or after the acid-oil mixture is transferred from the holding tank 6 as shown to form a base-added mixture 7. The base can be added to neutralize the acid-oil mixture, for instance, to bring the pH of the mixture to a range of 5 to 8, and preferably 6 to 7. The base can promote the neutralization of free fatty acids contained in the acid-oil mixture. The base can be stored in a working or holding tank prior to being added to the acid-oil mixture. The base is shown as stream 8.

The base 8 can include sodium hydroxide, potassium hydroxide, sodium silicate, sodium carbonate, calcium carbonate, or combinations thereof. The base can be used in range from 0.02 to 0.2 percent by weight based on total weight of the oil in the acid-oil mixture. Concentrated base solutions, for instance, between 30 and 50 weight percent, can be used to reduce the amount of volume of base solution being added. Beyond the stoichiometric amount of base required to neutralize the acid and free fatty acids in the acid-oil mixture, surplus base can be added, for example, to adjust for certain oils to be degummed and the quality thereof.

Turning to FIG. 1, the base 8 can be added to the acid-oil mixture 7 prior to an agitation mixer 10, or alternatively a high-shear mixer, that provides high shear mixing. The high-shear mixer 10 can provide intense mixing at a shear rate of at least 15,000 $s^{-1}$ to form a neutralized oil mixture 12. The shear rate can be the fluid velocity in the gap between mixing components divided by the shear gap width for a high shear mixer. Optionally, the shear rate for dynamic mixers is the tip speed divided by the shear gap width (minimal clearance between the rotor and stator).

As used herein, to specify shear rates, the following equation can be used for calculating the shear rate for rotor-rotor mixers or rotor-stator mixers:

$$Shearrate(t) = \frac{V}{g}$$

wherein V is the tip speed of rotor (m/s), and g is the gap distance between rotor and stator (m). Notably, the tip speed of the rotor (V) should be at least 10 m/sec.

As used herein, to specify the shear rate for a homogenizer, microfluidizer, hydrodynamic, ultrasonic cavitation device, control flow cavitation reactor, static mixer, orifice plate, perforated plate, nozzle, venturi eductor or jet mixer, the following equation can be used:

$$Shearrate = \frac{V}{d}$$

wherein V is the flow velocity in the gap, orifice, or nozzle (m/s), and d is the gap, orifice, nozzle diameter or size (m). The velocity in the gap, orifice, or nozzle (V) should be at least 10 m/sec. The velocity in the gap, orifice, or nozzle (V) can be in the range of 10 to 200 m/sec.

In one embodiment, the shear rate generated by the high-shear mixer 10 is at least 20,000 $s^{-1}$, at least 30,000 $s^{-1}$, at least 50,000 $s^{-1}$, at least 75,000 $s^{-1}$, at least 100,000 $s^{-1}$, at least 250,000 $s^{-1}$, at least 500,000 $s^{-1}$, at least 1,000,000 $s^{-1}$ or at least 1,500,000 $s^{-1}$.

The agitation mixer 10 for mixing at high shear rates can be, for example, high-speed pumps, colloid mills, high-pressure jet nozzles, static mixers, high-pressure valve type homogenizers, turbine type rotor-rotor and rotor-stator homogenizers, static hydrodynamic cavitation apparatuses, dynamic hydrodynamic cavitation apparatuses, or ultrasonic cavitation devices. Hydrodynamic cavitation devices can include those described in U.S. Pat. Nos. 5,810,052; 5,931,771; 5,937,906; 5,971,601; 6,012,492; 6,502,979; 6,802,639; 6,857,774, ultrasound devices can include those supplied by Sonic Corp. Sonolators, rotor-stator mixers can include those supplied by IKA WORKS, Kady International, Charles Ross and Son Company, Silverson Machines, and rotor-rotor mixers can include those supplied by Pulsar.

High-shear energy, such as cavitational energy, can be created by passing the acid-oil mixture and base through a static cavitation apparatus having one or multiple orifices in series, such as a first orifice stage, or optionally coupling the first orifice state in series with a second orifice stage. Three- and four-stage orifice series also can be used to promote high shear mixing. Each stage can include a single orifice or optionally orifices in parallel or in series as desired. Orifice diameters can be in the range of 0.25 mm to 20 mm. Preferably, the orifice diameter, or diameters if a series of orifices, can be in the range of 0.15 to 10 mm, preferably 0.2 to 5 mm, or 0.3, 0.4, 0.5, 0.6. 0.7, 0.8, 0.9, 1, 1.5, 2, 2.5 or 5 mm. Each orifice stage can generate high shear rates as discussed below. The residence time of the mixture in the high-shear mixer can be less than 10 seconds, preferably less than 5 seconds, and preferably less than 1 second. In the case of an orifice, pressure drop across the high-shear mixer can be in the range of 50 to 2000, preferably 150 to 1500 and more preferably between 250 and 1000 psi or at least 300, 400, 500, 600, 700, 800 or 900 psi.

In another embodiment, the high shear mixing can be carried out in multiple stages in a multi-stage agitation. The multi-stage agitation can be achieved by one or more passes through the high-shear mixer 10, for instance, at least one, two, three, four or five passes of the acid-oil mixture having base added. Alternatively, a series of high-shear mixers can be used such that each high-shear mixer applies one or more stages of the multi-stage agitation. Each stage of the multi-stage agitation can subject the acid-oil mixture with base to intense mixing at a shear rate of at least 15,000 $s^{-1}$ to form a neutralized oil mixture 12. In another embodiment, one, two, three, four or more stages can generate a shear rate of at least 20,000 $s^{-1}$, at least 30,000 $s^{-1}$, at least 50,000 $s^{-1}$, at least 75,000 $s^{-1}$, at least 100,000 $s^{-1}$, at least 250,000 $s^{-1}$, at least 500,000 $s^{-1}$, at least 1,000,000 $s^{-1}$ or at least 1,500,000 $s^{-1}$.

The neutralized oil mixture 12, after being subjected high-shear mixing, either in a single pass, multi-pass or -stage agitation, can be transferred to a low-shear agitation mixer or low-shear mixer 14 to provide further mixing at low shear. The neutralized oil mixture 12 can be agitated for a predetermined period of time, for example, in the range of 1 to 30 minutes, and preferably 5 to 20 minutes. Preferably, water is added to the low-shear mixer during or prior to mixing. For example, as shown, water can be added directly to the mixing vessel that generates low shear mixing as described below.

Water in the amount of 0.2 to 4 or 0.5, 1, 1.5, 2, 2.5, 3 or 3.5 weight percent can be added to the neutralized oil mixture. The amount of water is measured as the total weight of the oil in the neutralized oil mixture. Preferably, deionized water is added to the neutralized oil mixture to ensure no additional impurities are present in the oil. Addition water is shown as steam 13 in FIG. 1.

With reference to the low-shear mixer 14, the mixer can be, but is not limited to, a reaction vessel having a stirrer, agitator or low-shear rotor-stator, a vessel having a recirculation loop, for example a recirculation loop passing through a mixer such as a centrifugal pump, or a static mixer within a pipe or a similar container. The maximum shear rate is calculated as the tip speed of the impeller divided by the gap between the impeller and the mixing tank.

The low-shear mixing step can provide a controlled mixing at a measured Reynolds number ($N_{Re}$) in the range of from 10 to 1000, 30 to 800, 40 to 700 or 100 to 600, or at least 200, 300, 400 or 500. Reynolds number is determined on the basis of the following equation:

$$N_{Re} = \frac{\rho N D^2}{\mu}$$

wherein D is a diameter (m) of an agitation impeller of a stirrer;
N is a rotational speed ($s^{-1}$);
$\rho$ is a density ($kg/m^3$) of a oil mixture and water; and
$\mu$ is a viscosity ($Pa \cdot s$) of a oil mixture and water.

In one embodiment, the agitation state of the water and neutralized oil mixture 12 during mixing is preferably a mixed state of laminar flow and turbulent flow, or a transitional state, which can be achieved at a measured Reynolds number ($N_{Re}$) in the range of from 10 to 1000. For example, a mixing vessel with an agitation impeller 14 can generate transitional state flow.

It is preferable that the mixing vessel includes an agitation impeller so that the water droplets formed in the vessel can promote homogeneous dispersion of any aggregated soap particles present in the vessel. The neutralized oil mixture and water is mixed such that the peripheral speed of the agitator impeller set in the mixing vessel can be in the range of 0.4 m/s to 6.0 m/s, and preferably in the range of from 0.7 m/s to 4.0 m/s, and more preferably in the range of from 1.0 m/s to 2.5 m/s for forming a water droplet distribution.

The low-shear mixing preferably achieves an average water droplet diameter greater than 100 microns and in the range of 50 to 300 microns. Without being bound by any particular theory, it is believed that a fine dispersion of water droplets promotes the neutralization reaction with the base. When agitation of the neutralized oil mixture and water is carried out at a transitional state flow as measured by a Reynolds numbers in the range of from about 10 to about 1000, improvement in the hydration and de-agglomeration of the soap particles occurs, which can lead to lower oil loss and higher quality degummed oil.

In another embodiment, the low-shear mixer can be operated at a shear rate of less than 1,000 $s^{-1}$. For example, the low-shear mixer can operate at a shear rate less than 1,000, 800, 600, 500, 400, 200, 150 or 100 $s^{-1}$. The low-shear rate can be calculated as disclosed above. The residence time of the neutralized oil mixture and water in the low-shear mixer can be in the range of 1 to 100, preferably 10, 20 or 30 minutes.

The mixture exiting the low-shear mixer, or the water mixed, neutralized oil 16, can be transferred to one or more separation phases to remove the added water or a portion thereof and impurities 20 from the oil to create a degummed oil product 18. During the degumming process, water can be present and mixed with the oil. Water can be entrained in the oil being fed to the process. Water can also be added to the oil by addition of aqueous acid and base solutions. In the low-shear mixing phase, water is directly added to the oil.

Separation of the water from the oil mixture 16 can be done with a decanter, centrifuge, hydrocyclone or similar separation equipment. The differences in densities of water and oil allows for a rapid and distinct separation of the two components. For example, if the low-shear mixer is a gravity tank with a mixer or agitator, the residence time can be selected to allow for gravitational separation of the heavy phase and light phase as desired.

Separation temperatures in a separation vessel can be adjusted as desired, for example, the separation temperature can be in the range of 20° C. to 150° C., 30° C. to 100° C. or 40° C. to 80° C. Preferably, the water and oil mixture can be introduced into a separation vessel at a temperature in the range of 20° C. to 60° C. Thus, water and oil mixture can be fed into the low-shear mixer at a temperature of 30° C. to 65° C.

The degummed oil product 18 resulting from separation of water and impurities, such as soaps and phosphatides, has an improved quality. The phosphatide content of the degummed oil can be less than 100, 90, 80, 70, 60, 50, 40, 35, 30, 20 or 15 ppm, whereas the starting phosphatide content of the oil being fed to the degumming system can be in the range of 200 to 1200 for crude oils and 30 to 200 for water degummed oils. The degumming process described herein can result in a degummed oil product having a reduction in phosphatide content of at least 80, 85, 90, 95, 97, 98 or 98.5 weight percent, as compared to the oil being fed to the process or being used to form the acid-oil mixture.

To further purify the degummed oil, it can be exposed to processing steps known in the art including bleaching or deodorizing, as may be necessary or desirable depending on the end use for which the degummed oil product is intended.

In order to promote a further understanding of the invention, the following examples are provided. These examples are shown by way of illustration and not limitation.

EXAMPLE 1

Six samples of crude soybean oil were used in a degumming process. The crude soybean oil in each test had a phosphatide content of 700 ppm. Concentrated phosphoric acid was added to the oil samples and mixed with an in-line mixer to distribute the phosphoric acid. The acid-oil mixture was maintained at 65° C. Caustic solution was added to the acid-oil mixture and the mixture having the added base was passed through a four-stage orifice system of four orifices in series to provide high shear mixing to form a neutralized oil mixture. The shear rate at stage one through the first orifice was 173,150 $s^{-1}$, at stage two through the second orifice the shear rate was 88,380 $s^{-1}$, at stage three through the third orifice the shear rate was 61,410 $s^{-1}$, and at stage four through the fourth orifice the shear rate was 21,530 $s^{-1}$. The shear rate was calculated through the orifices as disclosed above in the specification by measurements of velocity and diameter.

The neutralized oil mixture was then transferred and directly fed to a vessel equipped with a stirrer to provide low shear mixing. Deionized water was added to three of the six samples by transferring water directly to the vessel holding the oil mixture. The three samples having no water addition represent control samples to evaluate the improvement water contributes to removing impurities such as soaps and phosphatides. The samples were mixed at 65° C. for a period of 10 minutes at predetermined mixing speeds measured by Reynolds numbers. The mixed samples were then transferred from the vessel and the oil was separated and analyzed. For the separation procedure, the mixed samples were placed in a laboratory centrifuge and processed at 65° C. The results of the degumming processes are reported below in Table 1.

TABLE 1

| Test # | Low Shear Mixing Reynolds Number | Phosphoric Acid Addition (ppm) | NaOH Addition (%) by wt | Water Added (%) by wt | Soap Content (ppm) | Phosphatide Content (ppm) |
|---|---|---|---|---|---|---|
| 1 | 152 | 180 | 0.1 | 0.0 | 92 | 30 |
|   |     | 180 | 0.1 | 2.1 | 45 | 21 |
| 2 | 152 | 100 | 0.09 | 0.0 | 267 | 65 |
|   |     | 100 | 0.09 | 2.0 | 63 | 37 |
| 3 | 540 | 490 | 0.16 | 0.0 | 433 | 35 |
|   |     | 490 | 0.16 | 0.5 | 59 | 11 |

As can be seen in Table 1, the phosphatide content of an oil subjected to the degumming process can be lowered by 95.7, 97, 90.7, 94.7, 95 and 98.4 percent as compared to the starting phosphatide content of the oil being treated, in this case 700 ppm. The degumming process can reduce the phosphatide content of oil such that the resulting phosphatide content is less than 50, 40, 30, 20 or 15 ppm. The addition of water to the low-shear mixing step further reduces the impurity content of the oil. For example, the water addition resulted in an increase of 1.3, 4 and 3.4 percent of phosphatide reduction, or alternatively, a decrease of 9, 28 and 24 ppm phosphatides.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed:

1. A process for degumming oil, comprising:
   adding an acid to an oil to form an acid-oil mixture;
   mixing an aqueous base with the acid-oil mixture at high shear with an agitation mixer, the mixing being at a shear rate of greater than 15,000 s$^{-1}$ to form a neutralized oil mixture;
   adding 0.2 to 4 weight percent of water to the neutralized oil mixture, the water measured by the total weight of the oil in the neutralized oil mixture;
   mixing the water added neutralized oil mixture in an agitation mixer at a transitional state flow measuring a Reynolds number (N$_{Re}$) in the range of from 10 to 1000 to disperse the water in neutralized oil mixture;
   separating a portion of the water in the neutralized oil mixture to obtain a degummed oil.

2. The process of claim 1, wherein the agitation mixer operating at a shear rate of greater than 15,000 s$^{-1}$ is selected from a group consisting of high-speed pumps, colloid mills, high-pressure jet nozzles, static mixers, high-pressure valve type homogenizers, turbine type rotor-rotor and rotor-stator homogenizers, hydrodynamic cavitation reactors and ultrasonic cavitation devices.

3. The process of claim 1, wherein the oil is a vegetable oil and the vegetable oil is a crude oil or water-degummed oil.

4. The process of claim 1, wherein the acid is selected from the group consisting of phosphoric acid, hydrochloric acid, sulfuric acid, ascorbic acid, acetic acid, citric acid, fumaric acid, maleic acid, tartaric acid, succinic acid, glycolic acid, or a combination thereof.

5. The process of claim 1, wherein the base of the aqueous base is selected from the group consisting of sodium hydroxide, potassium hydroxide, sodium silicate, sodium carbonate, calcium carbonate, or a combination thereof.

6. The process of claim 1, wherein the Reynolds number is in the range of 100 to 600.

7. The process of claim 1, wherein the phosphatide content of the degummed oil is at least 90 weight percent less than the phosphatide content of the oil used to form the acid-oil mixture.

8. The process of claim 1, wherein the phosphatide content of the degummed oil is at least 95 weight percent less than the phosphatide content of the oil used to form the acid-oil mixture.

9. The process of claim 1, the oil used to form the acid-oil mixture having a phosphatide content greater than 200 ppm and the degummed oil having a phosphatide content of less than 50 ppm.

10. The process of claim 1, the oil used to form the acid-oil mixture having a phosphatide content greater than 500 ppm and the degummed oil having a phosphatide content of less than 50 ppm.

11. A process for the degumming oil, comprising:
    adding an acid to an oil to form an acid-oil mixture;
    mixing an aqueous base with the acid-oil mixture, and subjecting the acid-oil mixture containing the aqueous base to a multi-stage agitation to form a neutralized oil mixture, wherein each stage of the multi-stage agitation mixes the aqueous base and the acid-oil mixture at a shear rate of greater than 15,000 s$^{-1}$;
    adding 0.2 to 4 weight percent of water to the neutralized oil mixture, the water measured by the total weight of the oil in the neutralized oil mixture;
    mixing the neutralized oil mixture in an agitation mixer at a transitional state flow measuring a Reynolds number (N$_{Re}$) in the range of from 10 to 1000 to disperse the water in neutralized oil mixture;
    separating a portion of the water in the neutralized oil mixture to obtain a degummed oil.

12. The process of claim 11, wherein each stage of the multi-stage agitation mixes the acid-oil mixture and the aqueous base at a shear rate of greater than 20,000 s$^{-1}$.

13. The process of claim 11, the multi-stage agitation having at least two stages.

14. The process of claim 11, the multi-stage agitation having at least three stages.

15. The process of claim 11, the multi-stage agitation having at least four stages.

16. The process of claim 11, the multi-stage agitation having one stage that mixes the acid-oil mixture and the aqueous base at a shear rate of greater than 50,000 s$^{-1}$.

17. The process of claim 16, the multi-stage agitation having one stage that mixes the acid-oil mixture and the aqueous base at a shear rate of greater than 100,000 s$^{-1}$.

18. The process of claim 16, wherein the phosphatide content of the degummed oil is at least 90 weight percent less than the phosphatide content of the oil used to form the acid-oil mixture.

19. The process of claim 16, the oil used to form the acid-treated oil having a phosphatide content greater than 200 ppm and the degummed oil having a phosphatide content of less than 50 ppm.

20. The process of claim 11, the multi-stage agitation having a series of at least three orifices, wherein the first orifice in the series mixes the acid-oil mixture and the aqueous base at a shear rate of greater than 100,000 s$^{-1}$ and the second orifice and the third orifice in the series mixes the acid-oil mixture and the aqueous base at a shear rate of greater than 50,000 s$^{-1}$.

* * * * *